United States Patent [19]
DeVeau, Jr. et al.

[11] Patent Number: 4,545,644
[45] Date of Patent: Oct. 8, 1985

[54] OPTICAL FIBER CONNECTOR AND ARTICLES CONNECTED THEREWITH

[75] Inventors: George F. DeVeau, Jr., Stone Mountain; Calvin M. Miller, Lilburn, both of Ga.

[73] Assignee: AT&T Bell Laboratories, Murray Hill, N.J.

[21] Appl. No.: 637,344

[22] Filed: Aug. 3, 1984

Related U.S. Application Data

[63] Continuation-in-part of Ser. No. 538,966, Oct. 4, 1983, abandoned.

[51] Int. Cl.⁴ .............................................. G02B 7/26
[52] U.S. Cl. ................................ 350/96.21; 350/96.20
[58] Field of Search ................ 350/96.20, 96.21, 96.22

[56] References Cited

U.S. PATENT DOCUMENTS

| | | | |
|---|---|---|---|
| 3,989,567 | 11/1976 | Tardy | 360/96.20 X |
| 4,087,155 | 5/1978 | Deacon | 350/96.21 |
| 4,099,832 | 7/1978 | Warner, Jr. | 350/96.21 |
| 4,123,139 | 10/1978 | Sandahl | 350/96.21 |
| 4,146,300 | 3/1979 | Kaiser | 350/96.21 |
| 4,161,347 | 7/1979 | Tardy | 350/96.21 |
| 4,201,443 | 6/1980 | Hodge | 350/96.20 |
| 4,353,620 | 10/1982 | Schultz | 350/96.21 |
| 4,460,243 | 7/1984 | Strait, Jr. | 350/96.20 |

OTHER PUBLICATIONS

*AEU Archiv fur Elektronik und Ubertragungstechnik Electronics and Communication,* (1975), pp. 50-52.
*Applied Optics,* vol. 14, No. 5, May 1975, pp. 1225-1227.
*Proceedings IEEE,* vol. 123, No. 6, Jun. 1976, pp. 627-632.

Primary Examiner—William L. Sikes
Assistant Examiner—Akm E. Ullah
Attorney, Agent, or Firm—Eugen E. Pacher

[57] ABSTRACT

An optical fiber connector capable of producing very low-loss single-mode fiber connections is disclosed. The connector utilizes two capillary cylinders for holding the fiber ends, and a multiplicity, preferably three, cylindrical alignment rods that provide multi-point support for the cylinders. At least one, preferably two, of the alignment rods carry a "flat" extending from one end of the rod for a substantial fraction of the length of the rod. The assembly is held together by appropriate means, e.g., a substantially triangular alignment fixture. The presence of antiparallel flat-carrying alignment rods permits simple alignment of the two fiber cores, typically by means of rotation of one or both of the capillary cylinders.

10 Claims, 4 Drawing Figures

OPTICAL FIBER CONNECTOR AND ARTICLES CONNECTED THEREWITH

This application is a continuation-in-part of application Ser. No. 538,966, filed Oct. 4, 1983, now abandoned.

FIELD OF THE INVENTION

This invention pertains to splices and connectors for optical fiber.

BACKGROUND OF THE INVENTION

Optical fiber connectors and splices (hereinafter referred to collectively as "connectors") are an essential part of substantially any optical fiber communication system. For instance, connectors may be used to join segments of fiber into longer lengths, or to connect fiber to active devices such as radiation sources, detectors, or repeaters, or to passive devices such as switches or attenuators.

A novel optical fiber connector is disclosed in U.S. patent application Ser. No. 527,341, filed Aug. 29, 1983 by T. D. Mathis and C. M. Miller (Mathis herein), and assigned to the assignee of the instant application. The above patent application, incorporated herein by reference, discloses an optical fiber connector that utilizes two drawn glass capillary cylinders that serve to hold the two fiber ends and allow alignment of the ends by means of a simple alignment sleeve. The disclosed connector serves completely satisfactorily with multimode fibers, for which, due to their relatively large core diameter, alignment to within a few $\mu$m is generally acceptable. The connector has also been found to frequently give satisfactory results with single-mode fibers. However, we have observed that it is not always easy to achieve very-low loss connections, that is, connections having a loss of the order of 0.1 dB or less, with the connector as disclosed.

Making single-mode connections typically involves active alignment of the fiber ends. Prior art methods typically comprise translating one fiber end relative to the other, typically by means of a precision stage, until maximum energy coupling across the gap is observed, typically by means of a remote detector. As will be appreciated, such a delicate procedure is both difficult to carry out in the field and requires highly skilled personnel.

Single-mode fiber connections can be quite easily made by means of the Mathis drawn glass connector, since at least a relative coupling maximum can be achieved by mere manual rotation of one of the capillary cylinders with respect to the other. Relative rotation of the two capillary cylinders typically changes the relative position of the fibers held within the capillaries, since the capillary bore typically is not rigorously concentric with the outer cylinder surface, the reference surface. Furthermore, the fiber may not be rigorously centered within the capillary, and the fiber core may not be concentric with the fiber. If the total eccentricities of the two fiber ends to be joined are identical or at least very nearly so, then a low-loss connection can be achieved by merely rotating, within the alignment sleeve, one capillary cylinder with respect to the other, until maximum coupling is observed. This is very often possible with mated capillary cylinder pairs, i.e., cylinders originating from adjacent parts of the same drawn glass capillary tube. However, even with mated pairs it is not always possible to achieve connections having losses less than 0.1 dB, since achievement of such a low-loss level typically requires alignment of the fiber ends to within less than about 1 $\mu$m.

Because of the great advantages offered by the drawn glass or other "ferrule-type" fiber connectors, including low cost, simplicity, environmental stability, and versatility, a connector that uses drawn glass (or other) capillary cylinders and can consistently result in very low-loss single-mode fiber connections would be of considerable importance. This application discloses such a connector that, furthermore, is relatively simply and easily installed in the field, does not require expensive precision alignment apparatus, is rugged, and has good temperature cyclability.

SUMMARY OF THE INVENTION

A connector according to the invention comprises two capillary cylinders, a multiplicity, preferably three, alignment rods consisting preferably of the same material as the capillary cylinders, and means for maintaining the aligned capillary cylinders in fixed radial and axial relationship to each other. The alignment rods are basically of cylindrical shape, with typically two of them carrying a "flat" that is to extend from one end over a substantial fraction (typically about one half) of the length of the rod. It is the presence of these, suitably placed, flats which allows alignment of the fiber ends to within exceedingly close tolerances, as will be described in greater detail below. Although the following discussion of the invention frequently refers to drawn glass capillary cylinders serving as fiber terminus pieces, this is intended to be exemplary only. Terminus pieces of the type that can be used in the practice of the invention can consist of any appropriate material or combination of materials, including metal (machined, die cast), transfer-molded plastic, injection-molded plastic, ceramic, glass, and metal with plastic insert. The choice of material depends typically on the details of the connector requirements, e.g., maximum allowable loss, environmental characteristic, ruggedness, and permissible cost.

BRIEF DESCRIPTION OF THE DRAWINGS

Like features in the drawings are identified by like numerals.

DETAILED DESCRIPTION

Figure 1:
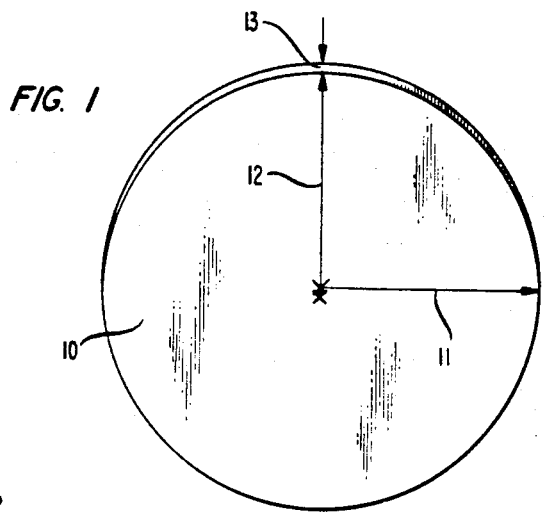
FIG. 1 shows schematically, in front view, an alignment rod with a flat.

As we have already mentioned above, very close tolerances have to be maintained in order to achieve low-loss single-mode fiber connections. Table I, a tabulation of calculated loss as function of core offset for standard single-mode fiber of 8.5 $\mu$m core diameter, for instance shows that, in order to achieve a splice of 0.1 dB loss or less in such fiber, it is required that the two opposed fiber cores be axially aligned to within about 0.7 $\mu$m. Since it would be clearly too expensive, and perhaps even impossible, to manufacture the relevant connector parts to such tolerances, active fiber alignment is the generally adopted solution. The single-mode connector according to the invention inter alia greatly simplifies the alignment process since typically only rotation of essentially cylindrical components is required to achieve alignment.

TABLE I

| Misalignment-caused Signal Loss | |
| --- | --- |
| Core Offset (μm) | Loss (dB) |
| .2 | 0.01 |
| .4 | 0.035 |
| .6 | 0.075 |
| .8 | 0.135 |
| 1.0 | 0.22 |

The following discussion is, for reasons of specificity, in terms of a particular kind of fiber terminus piece, namely, drawn glass cylinders. This is intended to be exemplary only, and the invention is not so limited.

The inventive connector comprises drawn glass capillary cylinders, with the fibers held in place in the capillary bore of the cylinder. Such cylinders, techniques for attaching them to a fiber, and procedures for preparing the fiber ends and abutting cylinder faces, have been described in Mathis and will not be further discussed herein.

The drawn glass cylinders can be relatively easily manufactured to have almost perfectly cylindrical cross section, and to have the desired ratio between the outer cylinder diameter and the diameter of the capillary bore. Although the outer diameter is difficult to maintain within close tolerances, mated pairs of cylinders typically have diameters that are substantially the same, differing generally by less than 1 μm.

A parameter that is very difficult to control closely is the eccentricity of the fiber core in the capillary cylinder. By the "total eccentricity ($\epsilon_t$)" we mean herein the distance between the cylinder axis (i.e., the center of the free end-face of the cylinder) and the center of the core of the fiber held within the capillary bore of the cylinder. $\epsilon_t$ consists of at least three components, namely, the eccentricity of the fiber core within the fiber $\epsilon_1$, the eccentricity of the fiber within the capillary bore $\epsilon_2$, and the eccentricity of the capillary bore within the cylinder $\epsilon_3$. The eccentricities associated with two different cylinders will be distinguished by superscripts. The total eccentricities of the two fiber cores in a connector according to the invention typically are not equal, although in connectors that utilize mated cylinder pairs $\epsilon_3^1 = \epsilon_3^2$ to a close approximation.

A further eccentricity that is significant in the discussion of the invention is the alignment-fixture offset $\epsilon_a$, i.e., the offset between the axes of the two capillary cylinders in the alignment fixture.

It is an object of the invention to provide a Mathis-type single-mode fiber connector that can typically be aligned by simple rotation of one or both of the capillary cylinders relative to the alignment fixture, such that the resultant core eccentricity $\epsilon_f$, i.e., the offset between the two fiber cores, can be made less than a predetermined quantity, typically less than about 1 μm, preferably less than about 0.7 μm. We achieve this object by means of an alignment fixture comprising a multiplicity (typically three) of essentially cylindrical alignment rods providing multi-point support of the two capillary cylinders of the connector. At least some of the alignment rods (typically two) carry a flat that extends from one end over part of the length of the rod. These flat-carrying alignment rods are typically maintained in fixed relation with respect to the capillary cylinders, and generate the alignment-fixture offset $\epsilon_a$ between the cylinder axes.

In order to achieve a connector with the greatest possible temperature stability, it is advantageous to use alignment rods that have substantially the same coefficient of thermal expansion as the capillary cylinders. This can be most easily achieved by the use of alignment rods consisting of the same material as the capillary cylinders, e.g., quartz or PYREX.

The alignment rods advantageously have uniform, essentially circular cross section, are essentially straight, and typically have plane end faces at right angle to the rod axis. Such rods can advantageously be produced from drawn glass stock. Flats can be put onto the alignment rods by any appropriate method. Typically, it will be a material removal method such as grinding, polishing, etching, or an appropriate form of sand blasting.

Figure 2:
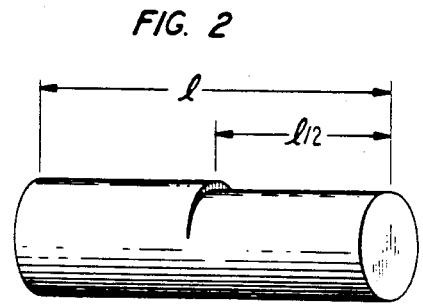
FIG. 2 schematically depicts such a rod in side view.

By use of the term "flats" we do not mean to imply that a plane surface is necessarily put onto the cylindrical rod. Indeed, a preferred geometry is not a flat surface but a curved surface having a central radius of curvature larger than the radius of the cylindrical rod, and merging more or less smoothly into the cylinder surface. Such a flat is shown schematically in FIG. 1, depicting an alignment rod 10 in axial view. Numeral 11 identifies the cylinder radius, 12 the central radius of curvature of the flat, and 13 the maximum flat offset Δ. FIG. 2 schematically shows the alignment rod 10 as viewed substantially perpendicularly to the rod axis. As is indicated in the Figure, the flat extends for about one-half the length of the rod. It is, of course, possible to use nonsymmetrical arrangements in which this would not be the case. However, it appears to be important that the flat geometry be substantially constant over the length of the flat, and especially that the flat be substantially parallel to the cylinder axis.

In the inventive connector a multiplicity of alignment rods is arranged around the two drawn glass capillary cylinders of provide multi-point support. Although a variety of arrangements are possible, including quadratic, rectangular, pentagonal, hexagonal, and even irregular ones, we believe that the simplest and most stable arrangement is a three-point arrangement, typically in symmetrical form.

The assembly of capillary cylinders and alignment rods is to be held in fixed relative relation by any appropriate means, e.g., an alignment fixture. We have found a simple elastic fixture to be satisfactory. An exemplary connector is shown schematically in FIG. 3, wherein fibers 30 and 30' are shown inserted into glass cylinders 31 and 31', respectively, and are held therein by appropriate means, e.g., UV curable adhesive. Alignment rods 10, 10' and 10" are shown located in the three "corners" of alignment bracket 32. The bracket can consist of any appropriate elastic material, e.g., beryllium copper, spring steel, or a Cu-Ni-Sn spinodal alloy, and is adapted to receiving the alignment rods and the two drawn glass cylinders, and to exerting thereon a position-maintaining force. As FIG. 3 indicates, the flat-carrying alignment rods are placed such as to have the flat ends point in opposite directions (to be referred to as "antiparallel" placement). In the three-point arrangement of FIG. 3 the third alignment rod, i.e., 10", need not have a flat, and, in fact, we believe this to be preferable. In connectors employing more than three alignment rods analogously alternating flat arrangements can be used. A connector can also comprise means for applying an axial force to the capillary cylinders, to maintain the free end faces in contact. Such means are shown in Mathis.

Figure 3:
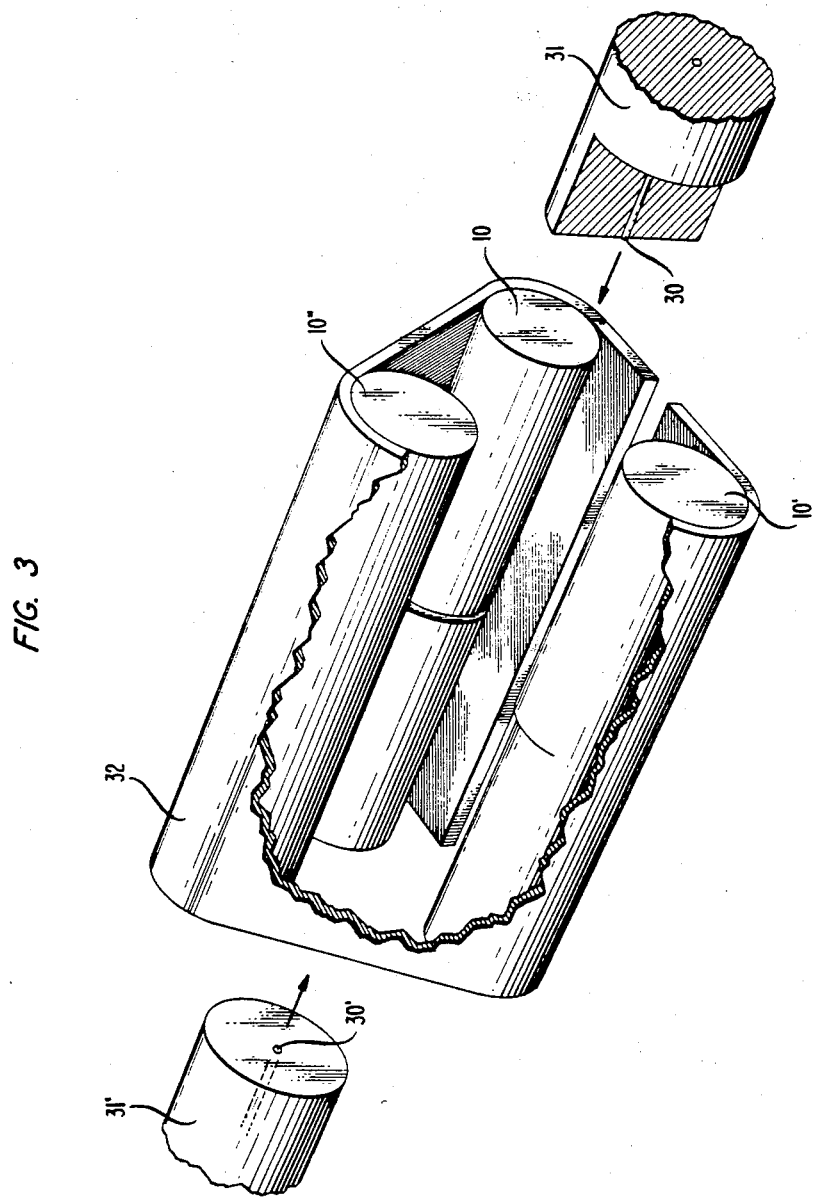
FIG. 3 shows schematically, in partial cut-away view, an exploded exemplary connector according to the invention.

An appropriate arrangement of alignment rods with flats, e.g., a three-point arrangement such as shown in FIG. 3, permits reduction of the fiber core offset $\epsilon_f$ to essentially zero, provided that the flat-offsets $\Delta$ of the alignment rods are of the appropriate size, within rather wide limits. We will now give a tutorial explication of the principle, simplified by generally neglecting two-dimensional aspects of the problem.

As before, $\epsilon_1$ = eccentricity of the core within the fiber, $\epsilon_2$ = eccentricity of the fiber within the capillary bore, and $\epsilon_3$ = eccentricity of the capillary bore within the drawn glass cylinder. $\epsilon_t$ denotes the total eccentricity of the fiber core with respect to the capillary cylinder. Superscripts 1 and 2 refer to fiber 1 and 2, and/or capillary cylinder 1 and 2, respectively. $\epsilon_a$ is the alignment fixture offset, and $\epsilon_f$ the fiber core offset. Eccentricities and offsets are considered to be nonnegative. $\epsilon_f$ can be adjusted to zero if $$|\epsilon_t^1 - \epsilon_t^2| < \epsilon_a < \epsilon_t^1 + \epsilon_t^2 \qquad (1)$$

The flat offsets $\Delta_1$ and $\Delta_2$ combine to generate $\epsilon_a$. For instance, $$\epsilon_a \sim 0.433(\Delta_1 + \Delta_2)$$

in the case of an equilateral triangular alignment bracket, with the antiparallel rods aligned such that their maximum flat offsets are pointed towards the center of the triangular bracket.

In general, $$\epsilon_t^i \leq \epsilon_1^i + \epsilon_2^i + \epsilon_3^i \quad i = 1, 2$$

and equation 1 can be written $$|\epsilon_1^1 + \epsilon_2^1 + \epsilon_3^1 - \epsilon_1^2 - \epsilon_2^2 - \epsilon_3^2| < \epsilon_a < \epsilon_1^1 + \epsilon_2^1 + \epsilon_3^1 + \epsilon_1^2 + \epsilon_2^2 + \epsilon_3^2 \qquad (2)$$

If a mated pair of capillary cylinders is used then $$\epsilon_3^1 = \epsilon_3^2 = \epsilon_3,$$

and equation 2 simplifies to $$|\epsilon_1^1 + \epsilon_2^1 - \epsilon_1^2 - \epsilon_2^2| < \epsilon_a < 2\epsilon_3 + \epsilon_1^1 + \epsilon_2^1 + \epsilon_1^2 + \epsilon_2^2 \qquad (3)$$

Typical values for $\epsilon_1 + \epsilon_2$ are of the order of 1-2 $\mu$m, and of $\epsilon_3$ of the order of 5-10 $\mu$m. The above analysis thus indicates that in the typical case appropriate values of $\epsilon_a$ are about 4-10 $\mu$m, which implies $\Delta_i$ about 4.5-11.5 $\mu$m. It is evident that the inventive connector can accommodate considerable latitude in $\Delta_i$. Typically $\Delta_i$ will however be less than about 25 $\mu$m.

Figure 4:
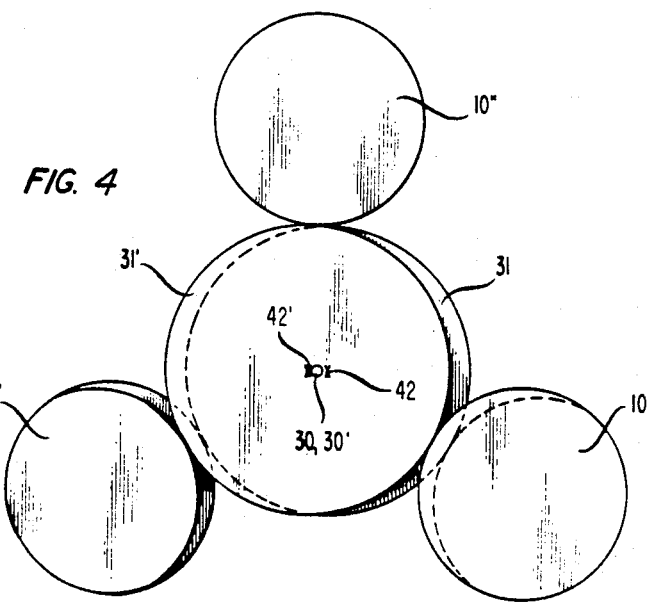
FIG. 4 illustrates the alignment principle utilized in connectors according to the invention.

The alignment feature of the inventive connector is schematically illustrated in FIG. 4. Capillary cylinders 31 and 31' are contacting the flats of alignment rods 10 and 10', respectively. This results in a finite $\epsilon_a$, as indicated by non-coincidence of 42 and 42', the centers of cylinders 31 and 31', respectively. Appropriate rotation of 31 and/or 31' can produce alignment of the fiber cores 30 and 30', i.e., $\epsilon_f = 0$, as is shown in FIG. 4. It is evident that the cylinders are to be in contact with only the flat portion or the cylindrical portion of an alignment rod, but not with both at the same time, thereby avoiding tilt of the cylinder.

In addition to the components shown in FIG. 3, a connector according to the invention typically comprises other components, such as means for maintaining the abutting ends of the fibers in axially fixed relation with each other, and connector bases to, inter alia, hold the coated fiber securely with respect to the connector. Such components are disclosed in Mathis, and will therefore not be further discussed herein.

A great variety of different components can be used to achieve these and other ends, as may be required in particular embodiments of the invention. Among the possible embodiments are twist-lock and screw-in connectors of the type familiar for coaxial cable connectors. Further obvious variations on the invention disclosed herein are the use of index-matching material between the fiber ends, and fixation by appropriate means (e.g., adhesive) of glass capillary cylinders and alignment rods after completion of alignment. However, such fixation may result in undesirable differential thermal expansion effects and does not, in general, constitute a preferred approach. A completed connector can, of course, be attached to some substrate, e.g., a mounting plate or a housing, or remain unattached. Means for attachment are well known to those skilled in the art and include magnetic means, and screws or other fasteners.

EXAMPLE

A polycarbonate connector base was epoxied to a 2.5 mm diameter, 13 mm long, drawn PYREX capillary cylinder, the stripped end of standard coated single-mode fiber threaded through base and cylinder, attached thereto with UV curable epoxy, the protruding fiber end scribed and broken, and the fiber end and cylinder end face polished. The components and procedures were substantially as disclosed in Mathis. A second fiber end was similarly prepared. PYREX rods, 2 mm diameter, 10 mm long, were used as alignment rods. Two of the rods had been prepared, by means of manual grinding, to have curved "flats", of the type shown in FIG. 1, having maximum flat offset $\Delta$ of about 8 $\mu$m, and length of about 5 mm. The three alignment rods and the two drawn glass cylinders were then assembled in a gapped beryllium copper mounting bracket of shape substantially as shown in FIG. 3, in the manner indicated in that Figure, by a procedure comprising prying apart the gap in the bracket by means of an appropriately modified pair of pliers. The bracket was formed from 15 mil sheet stock, was 10 mm long, and produced an estimated contact force of about 10 lb (about 40 N) between the glass cylinders and the alignment rods. After connecting the remote end of one fiber to a standard 1.3 $\mu$m laser signal source, a relative eccentricity minimum was found by manually rotating the first capillary cylinder relative to the bracket while monitoring the intensity of the light scattered at the connector. After attainment of the first relative minimum, a lower second minimum was located by rotating the second capillary cylinder in one direction by a small fixed amount, and then minimizing the scattered light by rotating the first cylinder. Repeating this stepwise procedure, a position was found that resulted in 0.05 dB connector loss. The time required for aligning the connector was about 2 min. The connector was temperature cycled 5 times between $-40°$ and $+80°$ C., without any significant change in the measured loss.

When in the alignment procedure, as exemplified by the above Example, the rotation of the second cylinder in one direction by a small amount does not result, after rotation of the first cylinder, in a minimum that is lower than the preceding minimum, then the second cylinder is to be rotated in the other direction. This procedure will in general result in a very short time in very low-loss connections. For instance, 11 connectors assembled as in the above Example had an average loss of 0.047 dB, with a variance of 0.039 dB. These results were obtained with fibers having essentially identical spot size.

Although the above-described alignment procedure is simple, effective, and preferred by us, other procedures are possible. For instance, it is possible to introduce further degrees of freedom by rotating one or more of the flat-carrying alignment rods, thereby in effect selecting a value of $\Delta_1$ between zero and the maximum flat offset.

What is claimed is:

1. Optical fiber connector comprising
   (a) a first and a second substantially cylindrical body including a substantially axial bore, the first and second cylindrical bodies to be referred to as the first and second capillary cylinders, respectively, each capillary cylinder to receive in its bore a stripped portion of an optical fiber comprising an end of the optical fiber, the fiber to be maintained fixedly in the bore of the capillary cylinder, each capillary cylinder having at least one free end face, so as to permit said end of the fiber to be substantially flush with the free end face of the capillary cylinder,
   (b) first means for maintaining the first capillary cylinder in substantially fixed radial relation relative to the second capillary cylinder, with the free end faces in opposed position, and
   (c) second means for maintaining the first capillary cylinder in substantially fixed axial relation relative to the second capillary cylinder, characterized in that
   (d) the first means comprise a multiplicity of alignment rods, each rod having a radius, at least one of the rods including a "flat" extending from a first end of the rod for a substantial fraction of the length of the rod, a "flat" being a section of the rod having a radius of curvature larger than the radius of the rod, the difference between the radius of the rod and the minimum radial distance from the axis of the rod to the flat to be referred to as the "maximum offset", the alignment rods to be maintained in substantially fixed contacting relationship with the first and the second capillary cylinder.

2. Connector according to claim 1 wherein the alignment rods substantially consist of material having substantially the same coefficient of thermal expansion as the capillary cylinder material.

3. Connector according to claim 2, wherein the alignment rods substantially consist of the same material as the capillary cylinders.

4. Connector according to claim 1, wherein the alignment rods and the capillary cylinders are maintained in fixed contacting relationship by means comprising an alignment fixture adapted for elastically forcing the alignment rods against the capillary cylinders.

5. Connector according to claim 1, comprising three alignment rods of substantially identical radius, with at least two of the alignment rods each carrying a flat that extends for about half the length of the rod.

6. Connector according to claim 5, wherein the at least two alignment rods that comprise flats are to be arranged antiparallel, i.e., with their first ends pointing in opposite directions.

7. Connector according to claim 1, wherein the maximum offset is less than about 25 μm.

8. Single-mode optical fiber connector comprising
   (a) a first and a second substantially cylindrical body including a substantially axial bore, the first and second cylindrical bodies to be referred to as the first and second capillary cylinders, respectively, each capillary cylinder to receive in its bore a stripped portion of single-mode optical fiber comprising an end of the fiber, the fiber to be maintained fixedly in the bore of the capillary cylinder by adhesive means, each capillary cylinder having at least one free end face, so as to permit said end of the fiber to be substantially flush with the free end face of the capillary cylinder.
   (b) first means for maintaining the first capillary cylinder in substantially fixed radial relation relative to the second capillary cylinder, with the free end faces in opposed position, and
   (c) second means for maintaining the first and the second capillary cylinder free end faces in substantially fixed axial relationship, characterized in that
   (d) the first means comprise three alignment rods, each rod having a radius, all radii being substantially the same, two of the alignment rods each comprising a "flat" extending from a first end of the rod, a "flat" being a section of the rod having a radius of curvature that is larger than the radius of the rod, the flat extending from the first end of the rod for about half the length of the rod, and
   (e) the connector further comprises means for maintaining the alignment rods in substantially fixed contacting relationship with the first and the second capillary cylinder, with the two alignment rods that comprises flats to be arranged antiparallel, i.e., with their first end pointing in opposite directions.

9. A first optical fiber connected to a second optical fiber by means comprising an optical fiber connector according to claim 1.

10. A first single mode optical fiber connected to a second single mode optical fiber by means comprising an optical fiber connector according to claim 8.

* * * * *